C. STRONG.

Casket-Handles.

No. 6,497. Reissued June 22, 1875.

Attest:

Luman C. Colt

Harvey L. Roberts

Inventor:

Clark Strong

THE GRAPHIC CO. PHOTO-LITH. 39 & 41 PARK PLACE, N.Y.

UNITED STATES PATENT OFFICE.

CLARK STRONG, OF WINSTED, CONNECTICUT, ASSIGNOR TO THE STRONG MANUFACTURING COMPANY.

IMPROVEMENT IN CASKET-HANDLES.

Specification forming part of Letters Patent No. 126,500, dated May 7, 1872; reissue No. 6,497, dated June 22, 1875; application filed May 24, 1875.

*To all whom it may concern:*

Be it known that I, CLARK STRONG, of Winsted, Connecticut, have invented a new Improvement in Casket-Handles; and I hereby declare the following, when taken in connection with the accompanying drawings and the letters of reference marked thereon, to be a full, clear, and exact description of my newly-invented improvement in casket-handles, and which drawing constitutes part of this specification, and represents, in—

Figure 1:
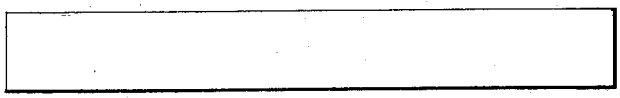
Figure 2:
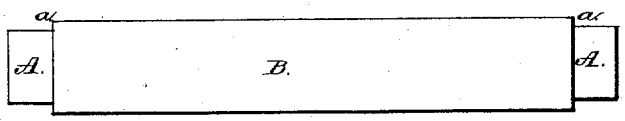
Figure 3:
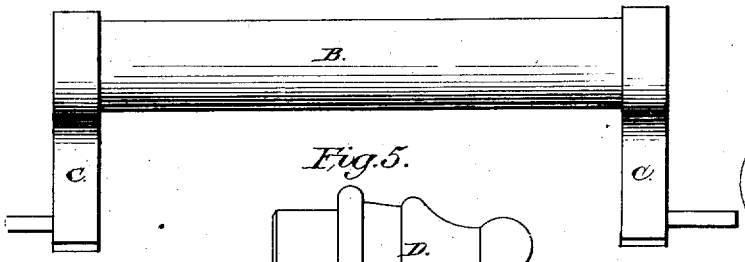
Figure 4:
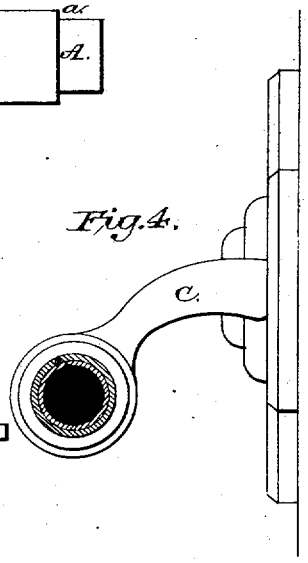
Figure 5:
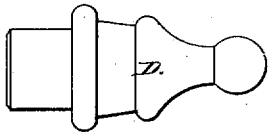
Figure 6:
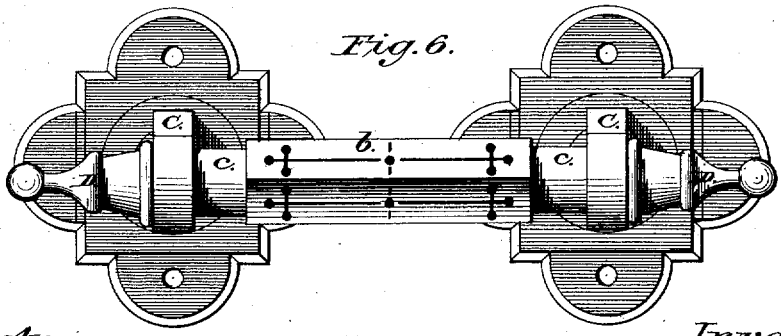

Figure 1, a front view of tube forming the base for the bar or hand-piece of the handle; Fig. 2, a front view of inner tube, combined with the outer or ornamental tube; Fig. 3, a front view of bar or hand-piece, with swinging levers; Fig. 4, a transverse section of handle; Fig. 5, an ornamental tip; Fig. 6, a view of handle complete, with hexagonal ornamented center section of tube.

This invention relates to an improvement in casket-handles, more commonly called coffin-handles, but adapted to other purposes; the object of the invention being to simplify their manufacture, give them increased strength, and to vary the style or configuration with the least change in the construction, and so produce a superior handle at a moderate expense.

My invention consists in constructing the bar or hand-piece by employing two tubes, one fitting over the other, forming shoulders at the ends of the hand-piece to aid in securing the connected parts.

Figure 1 is the inner tube or base of the hand-piece, being made of sheet-iron or other hard cheap metal, and affords the necessary strength for a reliable lifting-handle, and by means of it the swinging levers C C and ornamental tips D D are firmly secured in their places. Fig. 2 is the inner tube combined with the outer or ornamental tube, this being enough shorter than the inner tube to allow the swinging levers C C to be fitted to the end of the inner tube A A, and rest firmly against the shoulder *a a*, formed by the ends of the outer or ornamental tube B, to afford a firm connection with the swinging levers C C and ornamental tips D D. The outer or ornamental tube B is made of the softer metals, or their alloys cast upon the inner tube; and though it adds to the strength of the hand-piece, yet its principal purpose is for ornamentation, being much better adapted to the various configurations, or to a plain polished surface. It may be made in one piece, or in sections, as in Fig. 6, the center section *b* being hexagonal, ornamented, while the two end sections *c c* are round and plain. The center section may be gold and the rest silver; or one part may stand out in bold chased work and the rest be plain; or the center section may be beautiful raised jet-work, and the other sections gold or silver, or both.

By changing the shape, color, or material of one section of this ornamental tube B a new pattern of handle is obtained; and this method of ornamentation is well adapted to handles made the full length of a casket.

I claim as my invention—

1. The construction of the bar or hand-piece by employing two tubes, in combination with the swinging levers C C, substantially as and for the purpose set forth.

2. The tubular hand-piece, Fig. 2, having shoulders *a a* formed upon its ends to adapt it to a firm connection with the swinging levers C C and the ornamental tips D D, substantially as herein shown and described.

3. In a coffin-handle the outer tube cast upon the inner, as and for the purposes set forth.

CLARK STRONG.

Witnesses:
LUMAN C. COLT,
HARVEY L. ROBERTS.